United States Patent
Garcia Pascual

(10) Patent No.: US 6,908,376 B2
(45) Date of Patent: Jun. 21, 2005

(54) PROCESS FOR SYSTEMATIZING, INFORMATIZING AND AUTOMATING SELF-PROGRAMMED SLAUGHTER OF CATTLE AND BEEF PROCESSING

(76) Inventor: Ricardo Garcia Pascual, Diagonal 73 No. 2741, Prov. de Buenos Aires 1900 (AR)

( * ) Notice: Subject to any disclaimer, the term of this patent is extended or adjusted under 35 U.S.C. 154(b) by 294 days.

(21) Appl. No.: 10/221,021

(22) PCT Filed: Mar. 9, 2001

(86) PCT No.: PCT/US01/07568

§ 371 (c)(1),
(2), (4) Date: Dec. 9, 2002

(87) PCT Pub. No.: WO01/67211

PCT Pub. Date: Sep. 13, 2001

(65) Prior Publication Data

US 2003/0181156 A1 Sep. 25, 2003

(30) Foreign Application Priority Data

Mar. 9, 2000 (AR) .................................... P000101045

(51) Int. Cl.$^7$ ............................................. A22C 18/00
(52) U.S. Cl. ................................................. 452/157
(58) Field of Search .............................. 452/149, 157, 452/158

(56) References Cited

U.S. PATENT DOCUMENTS

| 4,628,569 | A | * | 12/1986 | Gagliardi, Jr. ............. 452/166 |
| 4,726,094 | A | | 2/1988 | Braeger ..................... 17/54 |
| 4,962,568 | A | | 10/1990 | Rudy et al. ................. 17/52 |
| 5,194,036 | A | | 3/1993 | Chevalier et al. ........... 452/198 |
| 5,464,368 | A | * | 11/1995 | White et al. ................ 452/149 |
| 5,470,274 | A | | 11/1995 | Kadi et al. ................. 452/184 |
| 5,525,103 | A | * | 6/1996 | White et al. ................ 452/149 |
| 5,855,507 | A | * | 1/1999 | Fisher et al. ............... 452/149 |
| 5,902,177 | A | * | 5/1999 | Tessier et al. .............. 452/156 |
| 5,944,598 | A | | 8/1999 | Tong et al. ................. 452/158 |
| 5,980,377 | A | * | 11/1999 | Zwanikken et al. ......... 452/184 |
| RE36,664 | E | | 4/2000 | O'Brien et al. ............. 452/157 |
| 6,104,966 | A | * | 8/2000 | Haagensen ................. 700/116 |
| 6,248,012 | B1 | * | 6/2001 | Folkmann .................. 452/135 |
| 6,527,636 | B2 | * | 3/2003 | Mickelsen .................. 452/149 |
| 6,607,431 | B2 | * | 8/2003 | Torrelli .................... 452/149 |

FOREIGN PATENT DOCUMENTS

| DE | 4223789 | * | 1/1994 |
| DE | 4317417 | * | 11/1994 |

* cited by examiner

Primary Examiner—Peter M. Poon
Assistant Examiner—David Parsley
(74) Attorney, Agent, or Firm—Jacobson Holman PLLC

(57) ABSTRACT

A process which systematizes, informatizes and automates cattle slaughter and beef processing, in factories with integrated Cycles I and II; following actual anatomical parameters, predetermined for each industrial biotype, scanned before entering the knockout box, the self-programmed operative model, which starts the system and automates the sequence of the slaughter and processing process of the programmed beef industrial biotype, is activated or not to optimize the obtainment of equal and homogeneous programmed cuts. Collaterally it is applied in the farming sector: by transfer of the best bovine genetics of each breed, to unify, program and systematize standard production of the industrial biotype on scale and to unify and program uniform production of large-scale equal forage.

1 Claim, No Drawings

PROCESS FOR SYSTEMATIZING, INFORMATIZING AND AUTOMATING SELF-PROGRAMMED SLAUGHTER OF CATTLE AND BEEF PROCESSING

This is a nationalization of PCT/USO/07568, filed Mar. 9, 2001 and published in English.

TECHNICAL FIELD OF THE INVENTION

The invention of the process aimed at systematizing, informatizing and automating the self-programmed slaughter of cattle and beef processing is used in industry, in factories with integrated cycles I and II; collaterally it is used in the farming world, in the sub-sector of cattle breeding and in the sub-sector of agriculture, for unifying, programming and systematizing production object of the invention:

In the sub-sector of cattle breeding for unifying, programming and systematizing production, standard in a long continuous large-scale series of the industrial biotype.

In the sub-sector of agriculture for unifying and programming uniform production of similar forage, in a long continuous large-scale series, so as to always have the same supplementary feed for the breeding herds and exclusive of the industrial biotype.

The invention of the process generates a system of production and conditioned industrialisation, by the juxtaposition of entities and activities with qualities and/or modified characteristic functions to obtain the industrial result that cannot function separately. Therefore, for the system to work, horizontal concentration and vertical integration are resorted to, under the same unified management in the framework of a unique schedule of five year modules.

STATE OF THE ART AND PROBLEMS TO BE SOLVED

BRIEF INTRODUCTION TO THE STATE OF THE ART

The association of man with cattle breeding for the purpose of making use of its meat and hides goes back into the realms of time, but the current art was born not more than a century and a half ago as a result of certain peripheral factors such as fencing, refrigeration and transport in an immense solitude without anybody to help organize and grow although its main characteristic paradoxically was the thousands and thousands of independent participants which went making it up. But those contributions were not enough to organize it; the art was held up in time, and the globalized demands came on top of it.

Production carries on through inertia, without planning, a manner which carries with it the drag of habitual and repeated maladjustment in the management of cattle herds over the years induced by the indiscriminate introduction of mixtures of beef cattle, age, weight, state, sex, without taking into account the animal requirements which with the passage of time has gone building up an inefficient cattle production system.

The state of the art is not serious, it is chronic disorganisation from its outset, as it was never well structured nor well implemented. It continues to lack the chain of value. As a direct result, even in the international market, there is no beef with a total quality certificate.

As it is today, in the state of the art if the offer has quality it cannot have quantity and, if it does not have quantity, then it cannot have continuity either.

These are the principal motives for which it is very difficult to purchase in the same place, within a week, the same quality of meat.

As we are dealing with a very complex art, as is the productive chain of beef for human consumption, it has been subdivided to improve the description of the following fields:

Bovine Genetics & Cattle Production
Cattle Feeding
Industrialization of Beef
Commercialization of Cattle, Carcass and Beef
Technology of Beef In each field a brief reference is made to the State of the Art, a clear explanation is attached of the possible problems which the invention of the process will solve, and the advantages relating to said state.

Bovine Genetics & Cattle Production:

Reference to the State of the Art: The current development of the art in this field is as considerable as it is important, due to the achievements in the improvement of bovine genetics which has been obtained over the past 50 years in all the beef breeds by successive crossings, creating new biotypes of beef in which the following permanent parameters stand out:

A larger muscular volume in the hindquarters.

A lower relative weight in the digestive tract, and consequently better conversion rates.

Also, the cattle are more precocious with a faster rate of growth.

It is inferred that improved bovine genetics is installed and available in the reproductive stage where the quality of the beef originates, even so:

Artificial insemination on a large scale in the reproductive stage, so as to take advantage of improved genetics, is not generalized;

Insemination implies improving what you have, not doing it for various reasons leaves you with the only option which is the natural service, using second level bulls which are bred by the pure pedigree breeders. These are known in the market as "pure by crossing".

There is a third option, if the previous options are not available, and that is to keep breeder bulls from your own herd, "general bulls", or to obtain them by exchanging or purchasing such bulls which should also be "general bulls" from a neighbouring breeder.

In the cattle-breeding sector, improved bovine genetics are not in general use; large-scale production of an industrial biotype is neither unified, nor programmed nor systematized.

Possible Problems with the State of the Art: A possible problem that calls for a solution is the lack of the transfer on large scale of improved genetics, from the reproductive stage to the productive stage; another possible problem is the consequent lack of large-scale production of an industrial biotype.

Solutions and Advantages of the Invention Relating to Said State: The industrial biotype is potentially available in each one of the breeds; the solutions and advantages of the invention of the process with relationship to said state consists of the large-scale transfer to breeding cattle—Productive Stage—of the best bovine genetics to unity, program and systematize the standard production in a long continuous series on a large-scale of a programmed industrial biotype of beef cattle under a same unified management.

Cattle Feeding

Reference to the State of the Art: To better describe the state of the art in the productive stage, it has been divided into the two most frequent feeding methods:

One method is that the bovine is respected as a ruminant and is fed as such with natural diets based on fresh or dehydrated forage; this method is ideal as it takes advantage of the best quality and availability of forage. Over the last years a productive turn around has taken place in agriculture and the improved genetics in vegetables has been specifically aimed at the productivity responding to technical factors and company management; for this reason it has taken hold with agricultural farmers. The production of feed for cattle with the available technological package (genetics, agrochemicals, mechanisation, management) has included new types of forage, improved harvesting techniques, storage and conservation, achieving the best utilisation of the nutrients in the supply of the forage chain throughout the year, by optimisation of the associated pastures and good management of the reserves, making hay, silage or dry grain.

The other method is that the bovine is not respected as a ruminant and is fed with non-ideal diets, 90% concentrates and 5% forage fibre. To this method should de added the habitual use of additives: hormonal additives with the periodic checking for of anabolic residues in the meat, the necessary preventive medicines such as antibiotics, other essential additives such as the ionophorous ones which are ruminant regulators; all of them are given to improve conversion, without taking into account biological inefficiency, to say nothing of the bovine biotype, or the genetic potential. Even more serious is the contamination of the feed which bovines ingest.: chicken bed, industrial meat, bone and blood meal, depuration mud from sewage liquids, organic wastes of industrial processes, all with a potential to transmit acquired incurable and/or mortal diseases for man (DES or diethylstilbestrol; B or Bovine Spongiform Encelopathy)

Possible Problems with the State of the Art: In method 1 the eventual problem to be solved is the lack of uniform production of equal long continuous large-scale series of forage.

Solutions and Advantages of the Invention relating to said state: The advantages of the invention of the process consist of: unifying and programming the uniform production of equal forage, in a long continuous large scale series, to be able to always have available the same feed as a supplement for the stud herds and exclusive for the industrial biotype under a same unified management.

Industralization of Beef

Reference to the State of the Art: In this field the different engineering branches continue to develop new technologies applicable in the industrial process:

HACCP norms (Hazard Analysis and Critical Control Points) in the production and industrialisation stages.

TENDERCUT System changing the timing in which certain cuts are made in the carcass (Cut while still hot);

Mechanised slaughter and beef processing (applicable to a same programmed industrial biotype of beef);

CAPTECH System (Controller Atmosphere Packing Technology), Packaging system with controlled atmosphere;

Norms ISO 9000 and 14000; Quality Control and Environmental Care.

Possible Problems of the State of the Art: This stage encompasses the meat industry, and is sub-divided to address the possible problems to be solved in the following two cases:

1—Due to the significance of some processing groups in factories with Cycles I and II.

2—Due to the atomization in the inverse cases of the "fashion" abattoirs.

In case I, the eventual problem is a hangover of the same cause already indicated previously: genetic improvement is not the norm installed in the productive stage of cattle breeding, the available carcasses for processing correspond to a typical bovines of a same group, consequently the new developed available technologies, are applied partially in this stage, or are not applied, precisely due to the lack of a standard industrial biotype which would allow to systematize, informatize and automate all the process of the beef industry.

In point 2, the new technologies are not applied for instrument and operative reasons. Generally we are talking of old factories having only Cycle I. Therefore, the abattoirs sell the half carcasses in the slaughtering yard to be transported to Cycle II factories, supermarkets or butchers for manual cutting.

Solutions and Advantages of the Invention relating to said State: The advantage of the invention of the process relating to said state, in this stage, consists in systematizing, informatizing and automating the self-programmed cattle slaughtering and beef processing, of a programmed beef of an industrial biotype, with industrial application in factories having integrated Cycles I and II, in accordance to actual anatomical parameters, predetermined for each industrial biotype, scanned before entering the knockout box, by which is activated or not activated the self-programmed operative model which starts the system automating the sequence of the industrial biotype slaughter and processing process, to optimize the obtaining of equal and homogeneous programmed cuts;

Commercialisation of Cattle, Carcass and Beef:

Reference to the State of the Art: cattle, carcass and beef Commercial transaction in the entire sector is chained and very atomized; amongst other methods, the following one is frequent:

1) Breeder
2) Auctioneer (cattle fair)
3) Fattening on the farm or feed lot
4) Auctioneer (cattle fair)
5) Processor (Cycles I and II)
6) Fashion Abattoir (Cycle I)
7) Auctioneer (Slaughtering Yard)
8) Supplier
9) Butcher—Supermarket (Cycle II)
10) Consumer This method is the linking, and which only links two immediate participants in a sporadic and eventual manner, there is no link of pairs, "the motto of the auctioneer is never to place into contact the seller with the buyer as this would spoil the deal"; also common is the private sale, so the price will not leak out.

Possible Problems of the State of the Art: The possible problems in the commercial field of all the industrial and productive meat sector, exceed the limits of what the average person can understand and grasp.

The causes of such excess may be due to negligence or be premeditated; not linked in the sector where they are generated, when this is exceeded, but linked and producing a domino effect in other sectors: first in the health and economy of the consumer, simultaneously in the economy of the farming sector, continuing on to the economy of the State, then generating problems between states, the domino effect finally reaching the producers.

Solutions and Advantages of the Invention relating to said state: The advantages of the invention of the process relating to said state are the following:

it prevents commercial linking;

it achieves a stability of prices;

it links the producer to the consumer through the administration;

it creates a value chain.

Meat Technology

Reference to the State of the Art: In the field of meat technology, more and more research is carried out every day. So much, that in many scientific institutions in the world, groups of expert multidisciplinary scientists dedicate their lives to such research, in all the productive sector of beef in a habitual and permanent manner, making important discoveries and valuable conclusions and contributions which are made known through conferences, seminaries, congresses, publications, news, and publicity.

Eventual Problems of the State of the Art: In this field the possible problems to be solved likewise can be assimilated to the field of genetics and industrialisation of beef, as, notwithstanding the availability of new tools and know-how, the struggle to transfer and assimilate them by the participants, is still not enough to change the rooted uses and customs.

It is not possible to bring about the changes, because putting it into practice depends on the feasibility to adapt them to the systems and methods in use. The argument to justify the delay in adopting the same originates in the variation of the differences and characteristics in a typical bovines of a same group which, in fact, is true: the variation does not allow the systematization of the tendercut; it makes mechanized slaughter and processing unpractical due to the wastes. Simultaneousness of the packaging with a controlled atmosphere is not possible. Neither is it possible to obtain the quality of the ISO norms.

Solutions and Advantages of the Invention relating to said state: The advantages of the invention of the process relating to said state consist of:

informatizing the self-programmed cattle slaughter and beef processing of one programmed beef industrial biotype, according to actual anatomical parameters, predetermined for each industrial biotype, scanned before entering the slaughter box, which activates or not, the self-programmed operative model which starts the system, the system which automates the sequence of the slaughter and processing process of the industrial biotype, to optimize the obtainment of equal and homogeneous programmed cuts.

Informatic technology allows immediate technological updating—in stage of the process, in all the future productive chain—, for the adopting of new technologies which might arise.

BRIEF DESCRIPTION OF THE INVENTION

A process for the systematization, informatization and automation of self-programmed cattle slaughter and beed processing, of one programmed beef industrial biotype, with industrial application in factories with integrated Cycles I and II; collaterally it is applied in the farming sector, in the subsections of cattle breeding and agriculture, where the industrial biotype and exclusive feed is produced.

It is characterized in that between the ages of 8 and 9 months, with approximately 300 kg, the male calves which have not been castrated and have not lost their milk-fat, are taken to the concentration enclosure, where they are classified and registered in the database, in accordance with the actual anatomical parameters, predetermined scanning on entry to the enclosure: A) Computerised axial tomography of the steak, muscle section "longissimus dorsi" on the $10^{th}$ and $13^{th}$ rib, B) Establishing the length of the stake, between the $7^{th}$ rib and the last lumbar vertebrae, C) establishing the length of the projection of a dorsal line, between the back and the tangent perpendicular plane to the rump, D) Establishing the distance which separates two tangent parallel planes to both recto femoral, E) establishing the height: hind quarters, back, and ventral; F) establishing live weight; this first comparison of registers, allows to forecast, at 90 days, the butchering performance, of each industrial biotype, where they are finished off with the same dehydrated forage, without antibiotics, nor anabolics, or ruminant regulators. Between the ages of 11/12 months, with 420 Kg slaughter live weight and with the adequate anatomical parameters, the industrial biotype will be finished for the slaughter and processing; 24 hours before it will be taken from the enclosure to the industrial centre, average distance 5 Km, the actual anatomical parameters are scanned and predetermined for each industrial biotype. Before entering the knockout box: A) computerized axial tomography of the steak, muscle section "Longissimus dorsi" on the $10^{th}$ and $13^{th}$ rib, B) establishing the length of the steak, between the $7^{th}$ rib and the last lumbar vertebrae, C) establishing the length of the projection of a dorsal line, between the back and the tangent perpendicular plane to the rump, D) establishing the distance which separates two tangent parallel planes to both eyes of the beef, E) establishing the height: hind quarters, back, and ventral, F) establishing slaughter live weight; the scanned registers are processed and compared with the predetermined indexes, to obtain the established technique "a priori" of: quality of the carcass, in accordance with the percentages of muscle, fat, bone, and quality of meat, in accordance to the colour and texture of intramuscular fat, and the muscle fibres associated with colour and tenderness; here the process activates the self-programmed operative model, which starts the system and automates the sequence of the slaughter process of the industrial biotype, to optimize the obtaining of equal and homogeneous programmed cuts, or rejects the stressed bovine which is sent to quarantine; on initiating the tasks in Cycle II, when the half carcass is taken from the cold room, a computerized axial tomography of the stake is scanned in the $11^{th}$ rib, to check and see if the colour has been maintained and the structure of the muscular fibres associated with tenderness as with the previous measurement, there are two possibilities: the process activates the entry to the cutting up room or it rejects it and sends the half carcass to another destination. In the cutting up room, the automatic application of the process will identify and scan the parameters: weight, length and section, of each anatomical cut, before the cuts; finally the three same parameters of each cut will again be scanned and registered before packaging, with controlled atmosphere. The values of the scanned actual anatomical parameters, are biunivocal registers which correspond to the identity of each bovine, these data complement the corresponding values fed in the available database, generated in the field for each herd; this long series of registers accumulated without a solution for continuity, shrinks more and more the value of standard deviation, from the value of up-dated mathematical average in each parameter; the tolerance which activates automating will be lower, to continue the beef slaughter and processing and, in consequence, the tendency towards the optimisation of sustainable productive reconversion of the cattle sector will be greater. The industrial biotype (excluding any other) is a whole male bovine, pure pedigree of the beef breed between the ages of 11/12 months and 420 kg pre-slaughter weight, fed only with exclusive equal forage. The industrial biotype is produced by programmed and scaled selective transfer to the breeding cattle subsection of the best bovine genetic of each breed, to unify and obtain the standard production in a long continuous series. It unifies and programs the uniform production of large scale equal forage, so as to always have the same feed as supplementary for the herds, excluding and exclusive for the industrial biotype. It avoids commercial linking, links the consumer with the producer through the administration, achieves stability of prices, obtains an added value product, creates a value chain and is apt for certifying total quality. The informatic methodology, which is applied, allows immediate technological updating, in any stage of the process, in all the future productive system, for the adoption of new technologies, which might arise. It generates an a typical conditioned industrialisation and production system by juxtaposition of entities and activities with modified characteristic qualities and/or functions, to obtain the industrial result, which cannot work separately, therefore, for them to work, horizontal concentration and vertical integration is needed, in the framework of a unique schedule of five year modules, under the same unified management. The structuring of the constructive, constitutive and functional aspects of the invention of the process are established, with the partaking of thousands of farmers, cattle breeders and agricultural producers of forages, in a horizontal concentration under a unified management which allows the enclosure of 300,000 head of cattle, rotated every 90 days, equivalent to 1,200,000 head of cattle per year, where the unified management, the industrial complex and operative centre for the vertical integration of all services under the control of the same unified management will function; the breeders and the agricultural producers are integrated to the management to an open production schedule, with five year contracts, the breeders to unify, program and systematize standard production of the industrial biotype and the agricultural producers to unify, program and systematize the uniform and exclusive production of equal forages, destined for the feeding of the cattle.

DETAILED DESCRIPTION OF THE INVENTION

Introduction: The object of the invention is a process aimed at systematizing, informatizing and automating self-programmed cattle slaughter and beef processing, of a programmed beef industrial biotype, to optimise the obtention of equal and homogeneous programmed cuts, apt for total quality certification, within the framework of the ISO norms. It is applied, specifically, in the beef industrial sector in factories with integrated Cycle I and II, and, collaterally, it is applied in the farming sector, in the subsection of cattle breeding to unify, program and systematize standard production, of an industrial biotype for each breed, in long continuous large scale series and, in the agricultural subsection, to unify and program the uniform production of large scale equal forage, for the feeding of the herds and the industrial biotype. In both sectors, as much in the industrial sector for design, equipment and the working of the factory with integrated Cycles I and II, as the farming sector, state of the art engineering techniques will be applied, amongst others, the best available proven animal and vegetable genetic lines and, informatic technology which will allow the immediate and permanent technological updating in all the productive system through the adoption of new available technologies which might arise.

Methodological Outlook: To implement the invention of the process, it is necessary to have a standardized industrial biotype, which is not produced in large scale; hence it has to be produced. To carry out the production of the industrial biotype the following basic principles will have to be taken into account: genetics, management, and feeding, industrial process. In the cattle breeder subsection, with the invention of the process, the advantage of the best available genetic in each breed is used, to program the industrial biotype in large scale.

The quality of the meat is genetic in origin, it is equal to the sum of its organoleptic qualities, which as such is an inherent characteristic of each beef breed. As a result, it can be said that the quality is the principle basic objective for programming the industrial biotype. The other enunciated principles are additional to genetics, extrinsically to the bovine: management, feeding, industrial process, being assimilative to all breeds as determined by man.

To be able to compete it is necessary, in addition to quality, to have quantity and at the same time continuity. The CCC is a sine qua non condition in the international market of globalized economy.

Quantity is important to handle the indeterminate eventual demand.

Continuity ensures permanent, continuous, non-interrupted supply.

The invention of the process generates a conditioned production and industrialization system,—by juxtaposition of entities and activities with modified characteristic qualities and/or functions to obtain the industrial result—which cannot work separately. Therefore, for the system to work, horizontal concentration and vertical integration is needed, within the framework of a unique schedule of 5 year modules.

The structuring of the constructive, constitutive and functional aspects of the invention of the procedure are established, with the partaking of thousands of farmers, cattle breeders and agricultural producers of forages, in a horizontal concentration under a unified management which allows the enclosure of 300,000 head of cattle, rotated every 90 days, equivalent to 1,200,000 head of cattle per year, where the unified management, the industrial complex and operative centre for the vertical integration of all services under the control of the same unified management will function; the breeders and the agricultural producers are integrated to the management to a five year module open production schedule, with five year contracts, the breeders to unify, program and systematize standard production of the industrial biotype and the agricultural producers to unify, program and systematize the uniform and exclusive production of equal forages, destined for the feeding of the cattle.

Projection of Production: The following table shows the values for the last year of each 5-year period of the Schedule: year mothers in service, slaughter of calves, racial purity and production in tons of meat. Evolution was calculated in the first 15 years, to the sole effect of showing the functional aspects regarding the norms and aims of the CCC, which are complied with and reach respectively:

| Year | Continuity mothers in service | Slaughter of calves | Quality % Racial Purity | Quantity Production Tons |
| --- | --- | --- | --- | --- |
| Initial | 2,600,000 | 1,200,000 | 75.00 | 175,200 |
| 5 | 5,466,000 | 2,624,000 | 98.40 | 383,200 |
| 10 | 19,926,000 | 9,565,000 | 100.00 | 1,396,900 |
| 15 | 72,260,000 | 34,685,000 | 100.00 | 5,065,400 |

The amount of mothers will be adjusted: to the geographical area or region for cattle breeding, the breed/s which are adopted, and the probability for the production of accessible forage.

Implementation: First Stage Constructive and Constitutive Aspects

Programming of industrial biotype: The industrial biotype is potentially available in each one of the breeds; the solution and advantage of the invention of the procedure with relationship to said state, consists in the transfer in large scale, of breeding cattle productive stage, of the best bovine genetics to unify, program and systematize standard production, in a long continuous large scale series, of a programmed beef industrial biotype, under a same unified management.

The management based on its geographical localization will study the relationship and behaviour in the ecosystem of the area, of the existing breeds and other breeds easily adaptable which will improve the relationship with the environment. This research work will be compared with the market study that will be carried out, at the same time, for the placement of the new product, as per Schedule, of the beef breed, which will have to be programmed, to unify its production within the parameters of age, feed, weight and preestablished rotation time, where the only important difference will be genetics and will appear in the organoleptic qualities, in the color (white nacre or creamy white), and marbling, taste and color and depth of intramuscular and subcutaneous fat, both variants required according to clients, between: lean and less lean cuts. Once the beef breed has been programmed, it is feasible to agree with the breeder his shared joining in the administration.

In accordance with this and the database, the administration will elaborate its five-year production schedule. It will agree with the breeders the formation of mother herds, which can start with the phenotypic selection on the existing general herd, incorporating new females or changing the breed.

Management of the stud stock: the formation of stud stocks requires, naturally, a cultural change in the relationship of man with the animal; the introduction of man in this new relationship, implies some prohibitions of traditional methods and customs which scare and sometimes ruin the animals, as they are untamed: amongst others: no dogs, no blows, no screams, no electric prods, or races to classify on horseback; instead, good manners and good customs, such as classifying on foot, patting the animals and encouraging them to get up, talk to the mothers, docile mothers docile calves, know the character, respect the customs and reactions of the animal, a relationship which will be simple and agreeable due to the gregarious and domestic characteristic of the bovine. Good management on foot of mothers will continue during the concentration.

In the field as well as in the concentration enclosure, the foremen in charge of the stud stock are the born guardians of the health of each animal; they are the ones who give out an immediate warning regarding abnormal symptoms at simple sight.

It is very necessary to insist on this subject at all times until all the persons involved with cattle understand that quality is born with each calf, that the calf has to be looked after in order to maintain it, that it goes adapting with the passing of time and that it is, at all times, the quid of the matter. This is an iron rule.

Formation of stud stock: the formation, follow up and control of stud stock will be in charge of a group of professional experts of areas related to engineering in animal production and veterinary medicine, dependant on the unified management of the administration. Amongst other functions, they will have the following:

to counsel the breeders to make up their stud stock, as from 1000 females as a minimum and sole bovine population in the rural establishment, by phenotypic selection of one breed, health and verified maternal aptitude;

to form and train the foreman in charge of the stud stock;

to maintain the health of the stud stock, to identify and check each one of the mothers;

to combine with the breeder the production program with synchronized servicing, which needs to be programmed in accordance with the five-year schedule. The best proven pedigree bull will be used to produce the industrial biotype which will be selected and provided free of charge by the administration from its semen bank;

see to it that only pregnant females will remain in the base stud stock;

to cooperate in the joint management with the producer.

They will have to monitor the forage chain, will program and build up the feed reserves, provide the dehydrated forage supplement for the calves and perhaps for the mothers;

They will build up the respective database, in the establishment and in the administration;

The second service is only for mothers with calf at foot;

In the third service it is the same as the second service; furthermore the stud stock will incorporate, prior phenotypic admission and selection, all calves with maternal aptitude born in the $1^{st}$ birth, continuing thus, successively;

They will check the anatomical parameters of the animals and will carry the statistical records;

Finally, they will tend to optimize production: one cow-one calf.

The administration will implement training courses for the auxiliary personnel of professionals in all activities necessary to attain the objective.

Female Calves and Pedigree: The female calves are weaned between 7 and 8 months, they will continue being range fed with a supplement of dehydrated forage, without loosing milk fat. The first service will be programmed and carried out in the same rural establishment. Female calves born from the first service will have 75% pure pedigree blood, their calves will have 87,5%, and thus successively in the fifth generation the calves will have 98,4% pure pedigree blood. The destination of the female calves will be replacement, increase the stud stock and/or creation of new stud stock, in the three destinations with confirmed pregnancy.

Feeding and Services: Here the invention of the process applied to unify, program and systematize the standard production of the industrial biotype, in a long continuous large scale series is notable. The date of the services is a function of production programming according to the five year schedule; it will not depend on the time nor of the offer and/or availability of seasonal forage, as sole feed for mothers. The administration will combine with the farmers on the production of programmed forage, within the same schedule and his shared joining to the administration. The service will be carried out at any time of the year, due to the availability of dehydrated forage reserves. Precisely the invention of the process applies to unify and program the uniform production of equal forage, in a long continuous large scale series, for supplementary feeding of herds and as main and exclusive feed for the industrial biotype under the same unified administration; it will be provided in the field by the administration free of charge for the breeder.

Dehydrated Forages: the link with farmers will have an analogous criteria to the one described for the relationship with breeders. Trained professionals, oriented in animal nutrition and expert in the production, conservation, transport and storage of forage will select the plots, will decide the forage variety, date and density of sowing, watering, will supervise cultural tasks, follow up and control of development, harvest time, monitoring of planning. The link between producers and management will be direct through the unified direction.

Male Calves: male calves will be produced on the field, at the foot of the mother, with supplement of dehydrated forage. Between the ages of 8 and 9 months, with approximately 300 kg, the male calves which have not been castrated and have not lost their milk fat, will be taken to the concentration enclosure where they are classified and registered in the database, in accordance with the actual anatomical parameters, predetermined scanning on entry to the enclosure: A) Computerized axial tomography of the steak, muscle section "longissimus dorsi" on the $10^{th}$ and $13^{th}$ rib, B) Establishing the length of the steak, between the $7^{th}$ rib and the last lumbar vertebrae, C) establishing the length of the projection of a dorsal line, between the back and the tangent perpendicular plane to the rump, D) establishing the distance which separates two tangent parallel planes to both eyes of the beef, E) establishing the height: hind quarters, back, and ventral; F) establishing live weight; this first comparison of registers, allows to forecast, at 90 days, the butchering performance, of each industrial biotype, where they are finished off with the same dehydrated forage, without antibiotics, nor anabolics, or ruminant regulators.

Definition of Industrial Biotype: the invention of the proceeding defines and adopts as programmed industrial biotype, a whole male bovine (excluding any other), pure pedigree for each beef breed, 11/12 months of age and 420 kg slaughter live weight, fed solely on exclusive equal forage.

It is not castrated; this criterion was adopted as the amount of comparisons made with scientific rigour, between whole and castrated animals, in the whole world (more than 70 studies have been carried out between the years 1954 and 1975), where all comparisons tend to coincide on the following:

a 12% higher rate of growth in animals left whole.

Equal organofeptic qualities than the castrated animals;

Less intramuscular fat in whole animals;

Greater muscle percent in whole animals.

Second Stage, Industrial Process

Transport of Bovines and Rest Prior to Slaughter: Between 11/12 months of age, with 420 kg slaughter live weight and with the adequate anatomical parameters, the industrial biotype will be ready for slaughter; 24 hours before the animal will be taken from the enclosure to the industrial centre, average distance 5 km.

The enclosures in the industrial centres will be spacious, with weather protection and/or shade, similar to, so they do not miss, the previous surroundings; the environment will be free of atmospheric contamination, (odours, noise, fumes, gasses, vibrations, radiation); the welfare of the animals, in this stage, will be permanently monitored, all necessary measures will be taken to mitigate all forms of discomfort which might give rise to individual and/or collective stress.

Application of Procedure in Quality Control before Slaughter: After bathing (HACCP norms), in the last part of the sleeve, the final process for quality control starts, based on the actual anatomical parameters, predetermined for each industrial biotype, scanned before entering the knockout box: A) computerised axial tomography of the steak, muscle section "Longissimus dorsi" on the $10^{th}$ and $13^{th}$ rib, B) establishing the length of the steak, between the $7^{th}$ rib and the last lumbar vertebrae, C) establishing the length of the projection of a dorsal line, between the back and the tangent perpendicular plane to the rump, D) establishing the distance which separates two tangent parallel planes to both eyes of the beef, E) establishing the height: hind quarters, back and ventral, F) establishing slaughter live weight; the scanned registers are processed and compared with the predetermined indexes, to obtain the established technique "a priori" of: quality of the carcass (butcher yield), in accordance with the percentages of muscle, fat, bone, and quality of meat, in accordance to the colour (white nacre or creamy white) and texture (degree of marbling: more or less lean) of intramuscular fat—in accordance with the sub-division and the scale of the New York State College of Agricultural, Cornell University, USA, and the muscle fibres associated with colour (dark colouring) and tenderness (stress); at this point, the process activates the self-programmed operative model, which starts the system and automates the sequence of the slaughter process of the industrial biotype, to optimize the obtaining of equal and homogeneous programmed cuts, or rejects the stressed bovine which is sent alive to quarantine.

Application of Procedure in Quality Control before Cuts: Before starting the cleaning of the half carcass, certain tissue cuts are carried out—Tendercut system—to physically avoid the post-mortem muscular contraction, in addition and likewise the rate of cooling will be controlled, during the process of beef maturity in the chamber. On starting the tasks in cycle II, when the half carcass is taken from the cold room, a computerized axial tomography of the steak is scanned in the $11^{th}$ rib, to check and see if the colour (dark colouring) has been maintained and the structure of the muscular fibres associated with tenderness (stress); as with the previous measurement, there are two possibilities: the process activates the entry to the cutting up room or it rejects it and sends the half carcass to another destination. In the cutting up room the automatic application of the process, will identify and scan the parameters: weight, length and section, of each anatomical cut, before the cuts; finally the three same parameters of each cut will again be scanned and registered before packaging, with controlled atmosphere (CAPTECH system). This accumulation of statistical registers, without a solution to continuity, shrinks more and more the value of the standard deviation of the value of the mathematical mean updated in each parameter, the tolerance which activates the automation to continue beef slaughtering will be smaller, and, as a result, greater the tendency towards the optimization of the object; each packaged cut will include a booklet with images and a specification from the origin (traceability) of the productive system, indicating the nutrients pointing out the essential and semi-essential aminoacids and and cooking suggestions; the same criterion will be applied to the preparation of food portions, prepared on trays, cooled or frozen ready for cooking, oven cooking or heating.

Third Stage, Functional Aspects:

Compendium of Background on Forages and breeding Cattle: areas which are apt for forage growth up to 500 km from the administration will be found, the obtained information will be gathered and processed, the fields will be selected, set up with each farmer the best forage to sow within the programmed options; later he joins and shares in the five year schedule and the administration.

Likewise, a detailed composition of the last decade of existing herds in the breeding are will be gathered, including field aptitude, infrastructure and relationship of head of cattle per hectare, in an area surrounding the administration site of up to a distance of 500 km.

Link of Producers to the Administration: this sharing will be of the "joint venture" type, with breeders and agricultural farmers, who will be in agreement with the five year schedule which will be drawn up by the unified management of the administration; by strict and rigorous compliance to keep it.

Site of Administration: The Administration will be placed in the area of influence of a free customs area, so that it can enable the building of the site of the productive complex as an adjoining sub-zone, in a surface of 10,000 hectares. The site for the building of the productive complex will be a semi-arid region, with light and frequent periodical winds, dry and template climate, with natural autochthonous deciduous forest, for shelter and sun in winter and shade in summer, soil: sandy, away from urbanized populated centres. There will be a permanent water supply apt for drinking and industry of approximately 350 L/S, for a permanent bovine population of 300,000 head+33% projected; an industrial plant for slaughtering of up to 6000 heads of cattle per day, another industrial tannery for the same amount of hides and a human population of 3000 inhabitants.

The site will be divided into 16 equal modules, each of which will be subdivided into 100 enclosures of 5 Has 40 areas each enclosure, one enclosure for 300 head of cattle, some 180M2 per calf for welfare, ambulating and rest.

The site's geographical centre will preferably be zoned, in 1000 Has, into areas: industrial, administrative, recreative, infrastructure and services and living complex.

What is claimed is:

1. A process to systematize, informatize and automate self-programmed bovine slaughter and beef processing, the process comprising the steps of:

taking male calves between 8 and 9 months of age, of approximately 300 kg, which have not been castrated and have not lost their milk-fat, to a concentration enclosure, where the male calves are classified and registered in a database, in accordance with actual anatomical parameters, scanning of the male calves on entry to the enclosure by: A) taking computerized axial tomography of the steak, muscle section on the $10^{th}$ and $13^{th}$ rib, B) establishing a length of the steak, between the $7^{th}$ rib and the last lumbar vertebrae, C) establishing a length of a projection of a dorsal line, between the back and a tangent perpendicular plane to the rump, D) establishing a distance separating two tangent parallel planes to both recto femoral, E) establishing a height of hind quarters, back and ventral; and F) establishing live weight;

comparing of predetermined anatomical parameters against each industrial biotype, to forecast, at 90 days, a butchering performance of each industrial biotype, where each industrial biotype is finished off with a same dehydrated forage, without antibiotics, nor anabolics, or ruminant regulators between the ages of 11/12 months, with a 420 Kg slaughter live weight;

scanning 24 hours before each industrial biotype will be taken from the enclosure to an industrial centre to start slaughtering and processing, actual anatomical parameters are for each industrial biotype;

establishing a quality of a carcass for each industrial biotype before entering a knockout box by: A) taking computerised axial tomography of the steak, muscle section on the $10^{th}$ and $13^{th}$ rib, B) establishing a length of the steak, between the $7^{th}$ rib and the last lumbar vertebrae, C) establishing a length of a projection of a dorsal line, between the back and a tangent perpendicular plane to the rump, D) establishing a distance separating two tangent parallel planes to both eyes of the beef, E) establishing a height of hind quarters, back and ventral, and F) establishing slaughter live weight;

comparing measurements obtained for establishing the quality of the carcass against predetermined indexes to obtain percentages of muscle, fat, bone, and quality of meat, color and texture of intramuscular fat, and muscle fibres associated with the color and tenderness;

activating a self-programmed operative model to automate a sequence of a slaughter process of the industrial biotype, to optimize obtaining of equal and homogeneous programmed cuts, or rejects a stressed bovine which is sent to quarantine;

initiating tasks when a half carcass is taken from a cold room, a computerised axial tomography of the steak is scanned in the $11^{th}$ rib, to check and see if the color has been maintained and a structure of muscular fibres associated with tenderness is present;

activating entry to a cutting up room if the predetermined anatomical parameters are met or sending the half carcass to another destination;

identifying and scanning parameters of weight, length and section, of each anatomical cut, before the cuts, and finally the three parameters of weight, length and section, of each cut are again scanned and registered before packaging, with controlled atmosphere, when values of scanned actual anatomical parameters, are biunivocal registers corresponding to an identity of each bovine, the data complementing corresponding values fed in the database, generated in a field for each herd;

shrinking more and more a value of standard deviation, from a value of up-dated mathematical media in each parameter;

lowering a tolerance which activates automating to continue beef slaughter and processing and, in consequence, a tendency towards an optimization of an objective being greater;

producing a pure thoroughbred of a beef breed between the ages of 11/12 months and 420 kg pre-slaughter weight, fed only with exclusive equal forage by producing the industrial biotype by programmed and scaled selective transfer to a breeding cattle subsection of best bovine genetic of each breed, to unify and obtain a standard production in a long continuous series;

unifying and programing uniform production of large scale equal forage so as to always have a same feed as supplementary for a stud stock, excluding and exclusive to the industrial biotype;

allowing immediate technological updating in any stage of the process; and generating an atypical conditioned industrialization and production system by juxtaposition of entities and activities with at least one of modified characteristic qualities and functions, to obtain an industrial result producing a pure thoroughbred of a beef breed between the ages of 11/12 monthes and 420 kg pre-slaughter weight, fed only with exclusive equal forage by producing the industrial biotype by programmed and scaled selective transfer to a breeding cattle subsection of best bovine genetic of each breed, to unify and obtain a standard production in a long continuous series;

unfying and programming uniform production of large scale equal forage so as to always have a same feed as supplementary for stud stock, excluding and exclusive to the industrial biotype;

allowing immediate technological updating in any stage of the process; and generating an atypical conditioned industrialization and production system by juxtaposition of entities and activities with at least one of modified charachteristic qualities and functions, to obtain an industrial result.

* * * * *